United States Patent
Shiga et al.

(10) Patent No.: US 11,142,469 B2
(45) Date of Patent: Oct. 12, 2021

(54) WATER TREATMENT APPARATUS

(71) Applicants: METAWATER Co., Ltd., Chiyoda-ku Tokyo (JP); SENKO RIKEN Co., Ltd., Kobe Hyogo (JP); NIKKISO CO., LTD., Shibuya-ku Tokyo (JP)

(72) Inventors: Junichi Shiga, Tokyo (JP); Tsukasa Kusano, Tokyo (JP); Tetsumi Ochi, Tokyo (JP); Shinya Watanabe, Toyko (JP); Eiichi Tsuga, Kobe (JP); Yusuke Kawakami, Kobe (JP)

(73) Assignees: METAWATER Co., Ltd., Tokyo (JP); SENKO RIKEN Co., Ltd., Kobe (JP); NIKKISO CO., LTD., Tokyo (JP)

( * ) Notice: Subject to any disclaimer, the term of this patent is extended or adjusted under 35 U.S.C. 154(b) by 0 days.

(21) Appl. No.: 16/344,913

(22) PCT Filed: Oct. 11, 2017

(86) PCT No.: PCT/JP2017/036887
§ 371 (c)(1),
(2) Date: Apr. 25, 2019

(87) PCT Pub. No.: WO2018/079266
PCT Pub. Date: May 3, 2018

(65) Prior Publication Data
US 2019/0256378 A1 Aug. 22, 2019

(30) Foreign Application Priority Data

Oct. 28, 2016 (JP) .............................. JP2016-212121

(51) Int. Cl.
*C02F 1/32* (2006.01)
*B08B 3/12* (2006.01)
(Continued)

(52) U.S. Cl.
CPC .................. *C02F 1/32* (2013.01); *B08B 3/12* (2013.01); *C02F 1/36* (2013.01); *C09D 127/18* (2013.01)

(58) Field of Classification Search
CPC .............. C02F 1/325; C02F 2201/3222; C02F 2201/3228; C02F 2201/324; C02F 1/32;
(Continued)

(56) References Cited

U.S. PATENT DOCUMENTS 4,296,066 A * 10/1981 Schenck ................. C02F 1/325
422/24
5,200,156 A * 4/1993 Wedekamp ............... A61L 2/10
313/493

(Continued)

FOREIGN PATENT DOCUMENTS

| CA | 2813068 A1 | 4/2012 |
|---|---|---|
| CN | 2618913 Y | 6/2004 |

(Continued)

OTHER PUBLICATIONS

Jun. 25, 2019, Office Action issued by the Canadian Intellectual Property Office in the corresponding Canadian Patent Application No. 3,041,642.

(Continued)

*Primary Examiner* — Wyatt A Stoffa
(74) *Attorney, Agent, or Firm* — Kenja IP Law PC

(57) ABSTRACT

Provided is a water treatment apparatus that can uniformly irradiate water to be treated with ultraviolet light in sufficient irradiation quantity and in which a cleaning device and the like can be mounted easily. A water treatment apparatus that subjects water to be treated to ultraviolet treatment using ultraviolet light, the water treatment apparatus comprises: a flow channel through which water to be treated flows; and an ultraviolet irradiation portion that is located on an opposite (Continued)

side of the flow channel from an inlet side, and irradiates the water to be treated flowing in the flow channel with ultraviolet light via a window portion toward the inlet side, the window portion being formed by a transparent member, wherein the flow channel includes a diameter increase portion, and the diameter increase portion is provided with at least one of: a cleaning device used to clean the window portion; and a sensor.

7 Claims, 3 Drawing Sheets

(51) Int. Cl.
*C02F 1/36* (2006.01)
*C09D 127/18* (2006.01)

(58) Field of Classification Search
CPC . C02F 1/36; A61L 2/10; C09D 128/18; B08B 3/16
See application file for complete search history.

(56) References Cited

U.S. PATENT DOCUMENTS

| | | | |
|---|---|---|---|
| 6,976,508 B2 | 12/2005 | Ueberall | |
| 2003/0086848 A1* | 5/2003 | Saccomanno | C02F 1/325 422/292 |
| 2004/0222163 A1* | 11/2004 | Saccomanno | C02F 1/325 210/748.11 |
| 2006/0186059 A1* | 8/2006 | Saccomanno | B01D 53/8675 210/748.11 |
| 2008/0105625 A1* | 5/2008 | Rosenberg | B08B 9/00 210/748.11 |
| 2010/0178201 A1* | 7/2010 | Belsky | A61L 9/205 422/24 |
| 2013/0248429 A1* | 9/2013 | Dahule | C02F 1/34 210/150 |
| 2015/0129776 A1 | 5/2015 | Boodaghians et al. | |
| 2015/0314024 A1* | 11/2015 | Khan | C02F 1/325 250/435 |
| 2016/0052802 A1* | 2/2016 | Ochi | C02F 1/325 250/435 |
| 2016/0083272 A1* | 3/2016 | Rajagopalan | C02F 1/325 250/435 |
| 2017/0156378 A1* | 6/2017 | Rimbault | A23L 3/28 |
| 2018/0250723 A1* | 9/2018 | Schomer | C02F 1/325 |
| 2018/0257953 A1* | 9/2018 | Mochizuki | G05D 7/0186 |
| 2019/0135658 A1* | 5/2019 | Yamakoshi | A61L 2/26 |

FOREIGN PATENT DOCUMENTS

| | | |
|---|---|---|
| CN | 105164056 A | 12/2015 |
| CN | 105452173 A | 3/2016 |
| DE | 4340406 C1 | 4/1995 |
| JP | 2005000738 A | 1/2005 |
| JP | 2005052760 A | 3/2005 |
| JP | 2010227838 A | 10/2010 |
| JP | 2013034979 A | 2/2013 |
| JP | 2016511138 A | 4/2016 |
| WO | 2013155283 A1 | 10/2013 |
| WO | 2014034988 A1 | 3/2014 |
| WO | 2015037260 A1 | 3/2015 |

OTHER PUBLICATIONS

Nov. 14, 2017, International Search Report issued in the International Patent Application No. PCT/JP2017/036887.
Apr. 30, 2019, International Preliminary Report on Patentability issued in the International Patent Application No. PCT/JP2017/036887.
May 6, 2020, the Extended European Search Report issued by the European Patent Office in the corresponding European Patent Application No. 17863543.9.
May 27, 2020, Office Action issued by the Taiwan Intellectual Property Office in the corresponding Taiwanese Patent Application No. 106137016.
Oct. 29, 2020, Communication pursuant to Article 94(3) EPC issued by the European Patent Office in the corresponding European Patent Application No. 17863543.9.
Jun. 22, 2021, Office Action issued by the China National Intellectual Property Administration in the corresponding Chinese Patent Application No. 201780066887.6.

* cited by examiner

WATER TREATMENT APPARATUS

TECHNICAL FIELD

The present disclosure relates to a water treatment apparatus, and particularly relates to a water treatment apparatus that subjects water to be treated to ultraviolet treatment using ultraviolet light.

BACKGROUND

As techniques for disinfecting water to be treated such as drinking water, techniques using ultraviolet irradiation (ultraviolet treatment) have been studied in recent years. For ultraviolet treatment on water to be treated, a water treatment apparatus including a flow channel through which water to be treated flows and a light source that irradiates the water to be treated flowing in the flow channel with ultraviolet light is used.

In the water treatment apparatus used for ultraviolet treatment, dirt may adhere to the light source during use, and cause a decrease in treatment performance. In view of this, as an example, PTL 1 discloses ultrasonically cleaning an ultraviolet lamp as a light source installed in a sewage pipe using an ultrasonic oscillator directly attached to the ultraviolet lamp, to prevent a decrease in the treatment performance of the water treatment apparatus. As another example, PTL 2 discloses ultrasonically cleaning an ultraviolet lamp installed in an apparatus body into which water to be treated flows using an ultrasonic oscillator attached to the bottom surface of the apparatus body, to prevent a decrease in the treatment performance of the water treatment apparatus.

CITATION LIST

Patent Literatures

PTL 1: JP 2005-738 A
PTL 2: JP 2010-227838 A

SUMMARY

Technical Problem

A water treatment apparatus using ultraviolet irradiation is required to uniformly irradiate water to be treated with ultraviolet light in sufficient irradiation quantity, to obtain treated water having improved and uniform water quality. However, since the ultraviolet light intensity typically decreases as the distance from the light source increases, in the case of applying ultraviolet light in a direction intersecting the flow direction of the water to be treated (e.g. a direction orthogonal to the flow direction of the water to be treated), it is difficult to uniformly irradiate the water to be treated with ultraviolet light in sufficient irradiation quantity.

This problem may be addressed by, for example, a water treatment apparatus 20 illustrated in FIG. 3. The water treatment apparatus 20 includes an ultraviolet irradiation portion 22 that applies, via a window portion 21, ultraviolet light in a direction (leftward in FIG. 3) opposite to the inflow direction of the water to be treated, to enable uniform ultraviolet treatment over a wide range in the flow direction of the water to be treated and ensure sufficient irradiation quantity. The water treatment apparatus having such a structure has, however, a problem in that a device for cleaning the window portion or a sensor for detecting the state of the window portion and the like is hard to be mounted because the flow channel of the water to be treated is in the way.

It could therefore be helpful to provide a water treatment apparatus that can uniformly irradiate water to be treated with ultraviolet light in sufficient irradiation quantity and in which a cleaning device and the like can be mounted easily.

Solution to Problem

A water treatment apparatus according to the present disclosure is a water treatment apparatus that subjects water to be treated to ultraviolet treatment using ultraviolet light, the water treatment apparatus comprising: a flow channel through which water to be treated flows; and an ultraviolet irradiation portion that is located on an opposite side of the flow channel from an inlet side, and irradiates the water to be treated flowing in the flow channel with ultraviolet light via a window portion toward the inlet side, the window portion being formed by a transparent member, wherein the flow channel includes a diameter increase portion, and the diameter increase portion is provided with at least one of: a cleaning device used to clean the window portion; and a sensor. By providing the ultraviolet irradiation portion on the opposite side of the flow channel from the inlet side and irradiating the water to be treated flowing in the flow channel with ultraviolet light toward the inlet side, the water to be treated can be uniformly ultraviolet-treated over a wide range in the flow direction of the water to be treated. Moreover, by providing the diameter increase portion in the flow channel, the cleaning device used to clean the window portion or the sensor can be mounted easily even in the case where the flow channel, the window portion, and the ultraviolet irradiation portion are in the above-described arrangement.

Preferably, in the water treatment apparatus according to the present disclosure, the diameter increase portion has a reverse tapered shape that gradually increases in inner diameter in a flow direction of the water to be treated. If the diameter increase portion has a reverse tapered shape, the cleaning device or the sensor can be easily mounted so as to be oriented to the center of the window portion.

Preferably, in the water treatment apparatus according to the present disclosure, the diameter increase portion is provided with at least a cleaning device including an ultrasonic oscillator, and the flow channel is lined with polytetrafluoroethylene on an inner circumferential surface thereof. If the inner circumferential surface of the flow channel is lined with polytetrafluoroethylene (PTFE), the water to be treated can be ultraviolet-treated more favorably using reflection of ultraviolet light on the inner circumferential surface. A PTFE lining does not transmit ultrasound well. Even in the case of using a cleaning device including an ultrasonic oscillator, however, if the cleaning device is located in the diameter increase portion, the ultrasonic oscillator can be oriented to the window portion to favorably clean the window portion.

Preferably, in the water treatment apparatus according to the present disclosure, the diameter increase portion is provided with at least a cleaning device including an ultrasonic oscillator, and an ultrasonic oscillation surface of the ultrasonic oscillator is oriented to a center of the window portion. By installing the ultrasonic oscillator so as to be oriented to the center of the window portion, the window portion can be cleaned effectively.

Advantageous Effect

It is thus possible to provide a water treatment apparatus that can uniformly irradiate water to be treated with ultraviolet light in sufficient irradiation quantity and in which a cleaning device and the like can be mounted easily.

DETAILED DESCRIPTION

Figure 1:
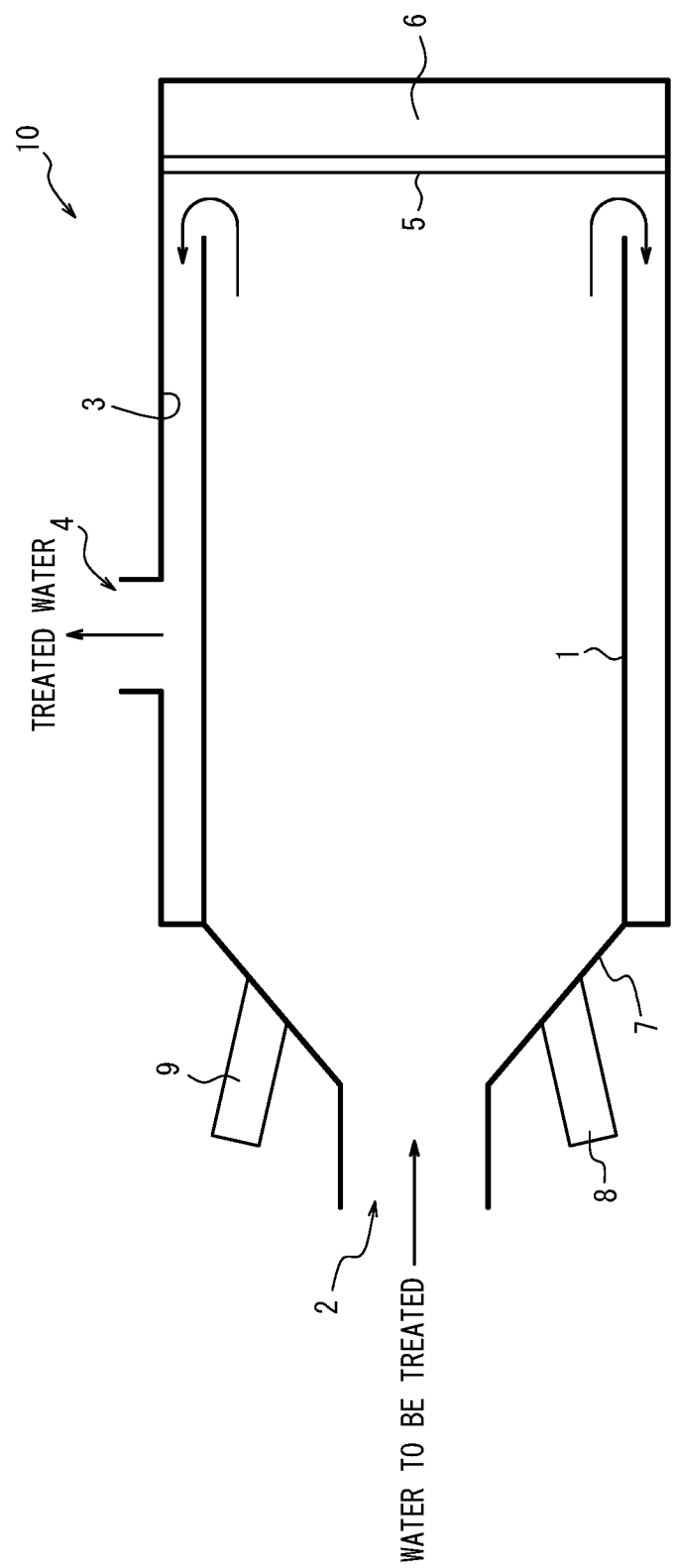
FIG. 1 is a sectional diagram illustrating a schematic structure of an example of a water treatment apparatus.

One of the disclosed embodiments will be described in detail below, with reference to drawings. In the drawings, the same components are given the same reference signs.

A water treatment apparatus according to the present disclosure can be used, for example, when disinfecting water to be treated in large-scale facilities such as water purification plants, small-scale water dispensers, sewage treatment plants, and ultrapure water production equipment, without being limited thereto. The water treatment apparatus according to the present disclosure is particularly suitable for use in, for example, disinfection treatment in production of drinking water in water purification plants.

Water Treatment Apparatus

FIG. 1 illustrates a schematic structure of an example of the water treatment apparatus according to the present disclosure, in a section along the flow direction of water to be treated. A water treatment apparatus 10 illustrated in FIG. 1 is an apparatus that irradiates water to be treated, which has flown into the water treatment apparatus 10, with ultraviolet light to ultraviolet-treat the water to be treated and obtain treated water.

The water treatment apparatus 10 includes: a flow channel 1 through which the water to be treated flows; a window portion 5 and an ultraviolet irradiation portion 6 located on the opposite side of the flow channel 1 from the inlet 2 side (the left side in FIG. 1); a treated water flow channel 3 through which treated water obtained as a result of ultraviolet-treating the water to be treated flows; and an outlet 4 through which the treated water flows out of the treated water flow channel 3. The flow channel 1 includes a diameter increase portion 7 that increases in inner diameter from the inlet 2 side to the window portion 5 and ultraviolet irradiation portion 6 side. The diameter increase portion 7 of the flow channel 1 is provided with an ultrasonic oscillator 8 as a cleaning device used to clean the window portion 5, and a sensor 9 that detects the dirt state of the window portion 5.

<Flow Channel of Water to be Treated>

The flow channel 1 can be formed using a pipe such as a SUS pipe, without being limited thereto. The flow channel 1 may be formed by connecting a plurality of pipes using a known connecting member such as a flange.

The flow channel 1 in the water treatment apparatus 10 includes a small-diameter portion, the diameter increase portion 7, and a large-diameter portion larger in inner diameter than the small-diameter portion, in this order from the inlet 2 side along the flow direction of the water to be treated. The diameter increase portion 7 of the flow channel 1 has a reverse tapered shape that gradually increases in inner diameter from the small-diameter portion side to the large-diameter portion side (i.e. in the flow direction of the water to be treated). The large-diameter portion of the flow channel 1 constitutes a double pipe structure with a pipe forming the treated water flow channel 3 (described in detail later), and the edge (the right edge in FIG. 1) of the large-diameter portion on the opposite side from the inlet 2 side in the flow direction of the water to be treated (the left-right direction in FIG. 1) terminates without being in contact with the window portion 5. That is, the flow channel 1 through which the water to be treated flows terminates while leaving a gap with the window portion 5.

In terms of causing ultraviolet light emitted from the ultraviolet irradiation portion 6 to reflect favorably on the inner circumferential surface of the flow channel 1 to ultraviolet-treat the water to be treated more favorably, the inner circumferential surface of the flow channel 1, in particular the inner circumferential surface of the large-diameter portion, is preferably lined with polytetrafluoroethylene, without being limited thereto.

<Window Portion>

The window portion 5 is formed by a transparent member capable of transmitting ultraviolet light emitted from the ultraviolet irradiation portion 6, and located on the opposite side (the right side in FIG. 1) of the flow channel 1 from the inlet 2 side in a watertight manner to prevent the water to be treated from flowing into the ultraviolet irradiation portion 6. The window portion 5 has a larger diameter than the inner diameter of the large-diameter portion of the flow channel 1, and is configured so that ultraviolet light emitted from the ultraviolet irradiation portion 6 is applied to the entire water to be treated flowing in the flow channel 1.

Non-limiting examples of the transparent member forming the window portion 5 include quartz glass, sapphire glass, and fluorine-based resin. In terms of durability and ultraviolet light transparency, quartz glass is preferable. As the method of watertight installation of the window portion 5, for example, a method by which a depression for installing the transparent member forming the window portion 5 is formed in a flange (not illustrated) for connecting the pipe forming the treated water flow channel 3 and the ultraviolet irradiation portion 6 and the flange connecting portion is sealed to be watertight using an O-ring, packing, etc. may be used, without being limited thereto.

<Ultraviolet Irradiation Portion>

The ultraviolet irradiation portion 6 includes a light source of ultraviolet light, and emits ultraviolet light toward the inlet 2 side via the window portion 5. Specifically, for example, the ultraviolet irradiation portion 6 contains the number of light sources that can ensure desired ultraviolet light intensity, in a housing chamber. The ultraviolet irradiation portion 6 thus irradiates the water to be treated flowing in the large-diameter portion of the flow channel 1 with ultraviolet light of approximately uniform intensity.

The light source of ultraviolet light may be any light source such as a mercury lamp, a xenon lamp, or an ultraviolet LED, without being limited thereto. In terms of safety and cost, an ultraviolet LED is preferable. The wavelength of ultraviolet light emitted from the light source is preferably 200 nm or more and more preferably 240 nm or more, and preferably 300 nm or less and more preferably 285 nm or less, without being limited thereto. Ultraviolet light in such wavelength ranges has high disinfection power.

<Treated Water Flow Channel>

The treated water flow channel 3 can be formed using a pipe such as a SUS pipe, without being limited thereto. Specifically, using a pipe (hereafter also referred to as "outer pipe") located on the outside of the large-diameter portion of the flow channel 1 and constituting the double pipe structure with the large-diameter portion of the flow channel 1, the treated water flow channel 3 can be formed between the outer circumferential surface of the large-diameter portion of the flow channel 1 and the inner circumferential surface of the outer pipe.

In the water treatment apparatus 10, the outer pipe is coaxial with the flow channel 1. The end of the outer pipe on one side (the left side in FIG. 1) in the axial direction is connected in a watertight manner to the edge of the pipe forming the large-diameter portion of the flow channel 1 on the inlet 2 side. The end of the outer pipe on the other side (the right side in FIG. 1) in the axial direction is connected in a watertight manner to the window portion 5.

<Ultrasonic Oscillator>

The ultrasonic oscillator 8 as the cleaning device for the window portion 5 is located in the diameter increase portion 7 of the flow channel 1 with its ultrasonic oscillation surface being oriented to the window portion 5. Specifically, the ultrasonic oscillator 8 is mounted on the inner side of a case composed of a cylindrical body attached in a watertight manner to the diameter increase portion 7 using a means such as welding so that its ultrasonic oscillation surface is oriented to the center of the window portion 5, without being limited thereto. Here, the ultrasonic oscillator 8 may be fixed to the case using a known fixing member such as a clamp, without being limited thereto. The end of the case on the opposite side from the flow channel 1 may be sealed in a watertight manner using a sealing member such as a lid. Part of the case and the ultrasonic oscillator 8 may extend into the flow channel 1.

<Sensor>

The sensor 9 that detects the dirt state of the window portion 5 is located in the diameter increase portion 7 of the flow channel 1 so as to be oriented to the window portion 5. Specifically, the sensor 9 is mounted on the inner side of a case composed of a cylindrical body attached in a watertight manner to the diameter increase portion 7 using a means such as welding so that its detection surface is oriented to the window portion 5, without being limited thereto. Here, the sensor may be fixed to the case using a known fixing member such as a clamp, without being limited thereto. The end of the case on the opposite side from the flow channel 1 may be sealed in a watertight manner using a sealing member such as a lid. Part of the case and the sensor 9 may extend into the flow channel 1.

The sensor 9 may be a known sensor such as an ultraviolet light sensor capable of detecting the dirt state of the window portion 5 from changes in the intensity of ultraviolet light transmitted through the window portion 5, without being limited thereto. The detection surface of the sensor 9 may be oriented to any position in the window portion 5. In terms of cleaning the window portion 5 at appropriate timing based on dirt detected by the sensor 9, however, the detection surface of the sensor 9 is preferably oriented to the same position as the ultrasonic oscillation surface of the ultrasonic oscillator 8 as the cleaning device.

<Ultraviolet Treatment>

The water treatment apparatus 10 having the structure described above can irradiate the water to be treated flowing from the inlet 2 toward the window portion 5 (rightward in FIG. 1) with ultraviolet light from the ultraviolet irradiation portion 6 via the window portion 5 toward the inlet 2 side (leftward in FIG. 1). Accordingly, a sufficient amount of ultraviolet light can be uniformly applied over a wide range in the flow direction of the water to be treated, to favorably ultraviolet-treat the water to be treated. Moreover, since the inner circumferential surface of the flow channel 1 is lined with polytetrafluoroethylene in the water treatment apparatus 10, ultraviolet light can be favorably reflected on the inner circumferential surface of the flow channel 1 to more favorably ultraviolet-treat the water to be treated.

In the water treatment apparatus 10, the treated water obtained as a result of ultraviolet-treating the water to be treated can be flown into the treated water flow channel 3 through the gap between the flow channel 1 and the window portion 5 and taken out of the outlet 4.

<Cleaning of Window Portion>

In the water treatment apparatus 10, the flow channel 1 includes the diameter increase portion 7, so that the ultrasonic oscillator 8 and the sensor 9 can be easily mounted in a state of being oriented in a desired direction. The water treatment apparatus 10, as a result of including the ultrasonic oscillator 8 and the sensor 9, can detect the dirt state of the window portion 5 by the sensor 9 and clean the window portion 5 using the ultrasonic oscillator 8, thus preventing a decrease in the ultraviolet irradiation quantity for the water to be treated due to dirt on the window portion 5. Especially, since the ultrasonic oscillation surface of the ultrasonic oscillator 8 is oriented to the center of the window portion 5 in the water treatment apparatus 10, the window portion 5 can be cleaned uniformly using ultrasound propagated through the water to be treated. Furthermore, since the ultrasonic oscillation surface of the ultrasonic oscillator 8 is oriented to the window portion 5 in the water treatment apparatus 10, the window portion 5 can be cleaned favorably even in the case where the inner circumferential surface of the flow channel 1 is lined with a material that does not transmit ultrasound well (e.g. polytetrafluoroethylene).

In the case where a plurality of ultrasonic oscillators 8 are located in the diameter increase portion 7 in the water treatment apparatus 10, the ultrasonic oscillators 8 are preferably spaced evenly in the circumferential direction of the diameter increase portion 7, in terms of uniformly cleaning the window portion 5. If scale precipitates on the window portion 5, such scale is hard to be removed by ultrasound irradiation alone, and also scale removed from the window portion 5 might clog the gap between the flow channel 1 and the window portion 5. Hence, the ultrasonic oscillator 8 preferably performs cleaning at short intervals.

While the water treatment apparatus according to the present disclosure has been described above by way of an embodiment, the water treatment apparatus according to the present disclosure is not limited to the foregoing embodiment. The water treatment apparatus according to the present disclosure can be subjected to changes as appropriate.

Specifically, for example, although the ultrasonic oscillator 8 as the cleaning device and the sensor 9 are both attached to the diameter increase portion 7 in the water treatment apparatus 10 of the foregoing embodiment, the water treatment apparatus according to the present disclosure may have a structure in which only the cleaning device is attached to the diameter increase portion without the sensor and cleaning is performed at predetermined intervals, or a structure in which only the sensor is attached to the diameter increase portion and, upon detecting dirt, disassembly and cleaning are performed or the window portion is replaced.

Figure 2:
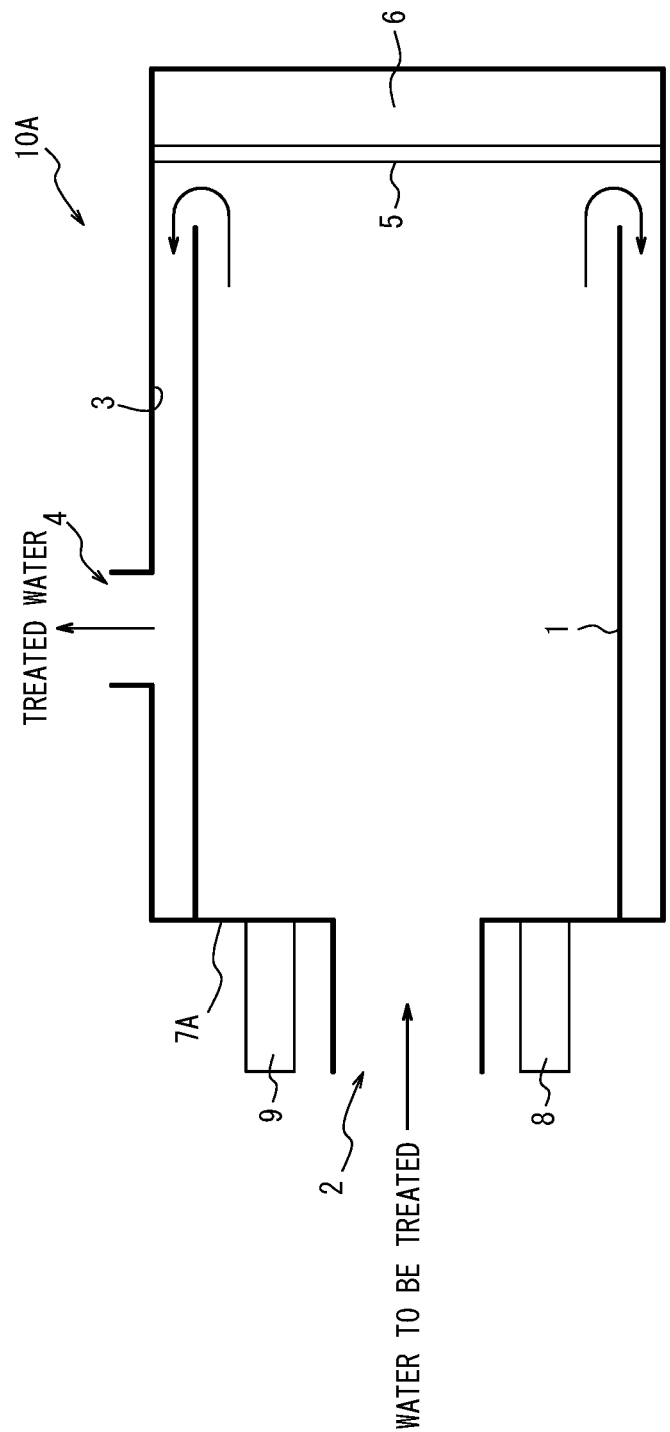
FIG. 2 is a sectional diagram illustrating a schematic structure of another example of a water treatment apparatus.
Figure 3:
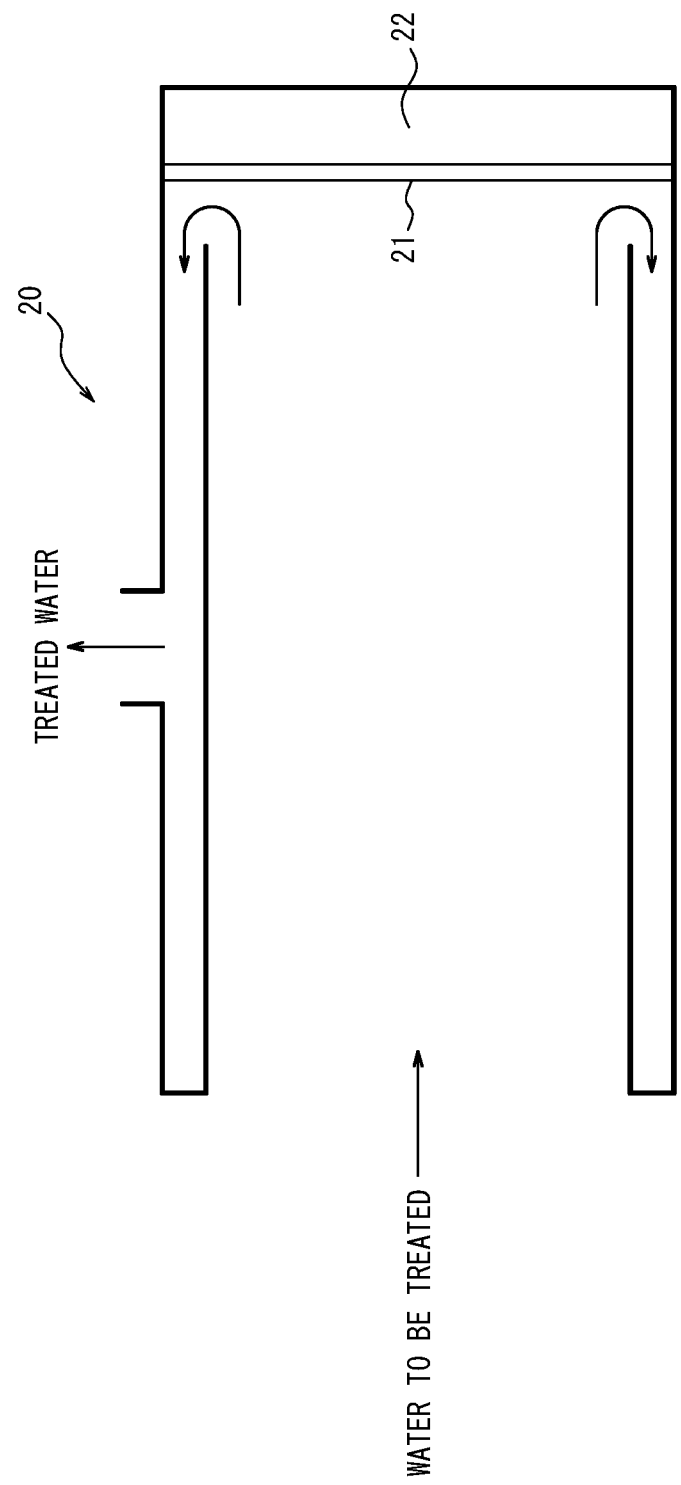
FIG. 3 is a sectional diagram illustrating a schematic structure of another example of a water treatment apparatus.

Although the diameter increase portion 7 of a reverse tapered shape that gradually increases in inner diameter in the flow direction of the water to be treated is used in the water treatment apparatus 10 of the foregoing embodiment, the shape of the diameter increase portion 7 is not limited to a reverse tapered shape. Specifically, for example, the diameter increase portion may be a diameter increase portion 7A that extends in a direction orthogonal to the flow direction of the water (i.e. the inner diameter of the flow channel 1 increases in steps), as in a water treatment apparatus 10A illustrated in FIG. 2. In terms of easily mounting the cleaning device or the sensor in a state of being oriented to a desired position in the window portion, however, the diameter increase portion preferably has a reverse tapered shape that gradually increases in inner diameter in the flow direction of the water to be treated.

Although the diameter increase portion 7 is provided with only the ultrasonic oscillator 8 used to clean the window portion 5 and the sensor 9 in the water treatment apparatus 10 of the foregoing embodiment, the diameter increase portion 7 may be provided further with a sensor that detects the dirt state of the ultrasonic oscillator 8 used to clean the window portion 5 and the sensor 9, and/or a cleaning device that, in the case where dirt adheres to the ultrasonic oscillation surface of the ultrasonic oscillator 8 used to clean the window portion or the detection surface of the sensor 9, cleans the dirt.

INDUSTRIAL APPLICABILITY

It is thus possible to provide a water treatment apparatus that can uniformly irradiate water to be treated with ultraviolet light in sufficient irradiation quantity and in which a cleaning device and the like can be mounted easily.

REFERENCE SIGNS LIST

1 flow channel
2 inlet
3 treated water flow channel
4 outlet
5, 21 window portion
6, 22 ultraviolet irradiation portion
7, 7A diameter increase portion
8 ultrasonic oscillator
9 sensor
10, 10A, 20 water treatment apparatus

The invention claimed is:

1. A water treatment apparatus that subjects water to be treated to ultraviolet treatment using ultraviolet light, the water treatment apparatus comprising:
   a flow channel through which water to be treated flows; and
   an ultraviolet irradiation portion that is located on an opposite side of the flow channel from an inlet side, and irradiates the water to be treated flowing in the flow channel with ultraviolet light via a window portion toward the inlet side, the window portion being formed by a transparent member; and a treated water flow channel through which treated water obtained as a result of ultraviolet-treating the water to be treated flows,
   wherein the flow channel includes a small-diameter portion, a diameter increase portion that increases in inner diameter and outer diameter, and a large-diameter portion larger in inner diameter than the small-diameter portion, in this order from the inlet side along the flow direction of the water to be treated,
   the treated water flow channel is formed using an outer pipe located on the outside of the large-diameter portion and constituting a double pipe structure with the large-diameter portion,
   an edge of the large-diameter portion on the opposite side from the inlet side in the flow direction of the water to be treated terminates while leaving a gap with the window portion,
   an end of the outer pipe on one side in the axial direction is connected in a watertight manner to an edge of a pipe forming the large-diameter portion of the flow channel on the inlet side,
   the diameter increase portion is provided with a cleaning device used to clean the window portion; and a sensor,
   the cleaning device is mounted on an inner side of a case that is attached in a watertight manner to the diameter increase portion, and
   the cleaning device and a detection surface of the sensor are oriented towards a same position.

2. The water treatment apparatus according to claim 1, wherein the diameter increase portion has a reverse tapered shape that gradually increases in inner diameter and outer diameter in a flow direction of the water to be treated.

3. The water treatment apparatus according to claim 1, wherein the diameter increase portion is provided with at least a cleaning device including an ultrasonic oscillator, and
   the flow channel is lined with polytetrafluoroethylene on an inner circumferential surface thereof.

4. The water treatment apparatus according to claim 1, wherein the diameter increase portion is provided with at least a cleaning device including an ultrasonic oscillator, and
   an ultrasonic oscillation surface of the ultrasonic oscillator is oriented to a center of the window portion.

5. The water treatment apparatus according to claim 1, further comprising an outlet through which the treated water flows out of the treated water flow channel, wherein
   the outlet is provided on an outer periphery of the outer pipe.

6. The water treatment apparatus according to claim 1, wherein
   an inlet of the flow channel is connected to a water source of the water to be treated.

7. The water treatment apparatus according to claim 1, wherein the cleaning device and the detection surface of the sensor are oriented to the same position.

* * * * *